United States Patent
Richter et al.

(10) Patent No.: US 12,535,297 B2
(45) Date of Patent: Jan. 27, 2026

(54) PROTECTIVE COVER FOR AN OPTICAL SIGHT

(71) Applicant: mb-microtec ag, Niederwangen bei Bern (CH)

(72) Inventors: Karsten Richter, Bern (CH); Philipp Michel, Gümligen (CH); Christian Schoen, Paderborn (DE)

(73) Assignee: mb-microtec ag, Niederwangen bei Bern (CH)

( * ) Notice: Subject to any disclaimer, the term of this patent is extended or adjusted under 35 U.S.C. 154(b) by 124 days.

(21) Appl. No.: 18/302,920

(22) Filed: Apr. 19, 2023

(65) Prior Publication Data
US 2024/0353200 A1  Oct. 24, 2024

(51) Int. Cl.
*F41G 1/14* (2006.01)
*C09K 11/70* (2006.01)
*F41G 1/38* (2006.01)
*F41G 11/00* (2006.01)
*G02B 23/16* (2006.01)

(52) U.S. Cl.
CPC .............. *F41G 1/383* (2013.01); *C09K 11/70* (2013.01); *F41G 11/004* (2013.01); *G02B 23/16* (2013.01)

(58) Field of Classification Search
CPC ... F41A 35/02; F41G 1/30; F41G 1/38; F41G 1/383; F41G 1/345; F41G 11/004; C09K 11/70; G02B 23/16
USPC ...................................................... 42/129, 143
See application file for complete search history.

(56) References Cited

U.S. PATENT DOCUMENTS

| | | | | |
|---|---|---|---|---|
| 2,527,043 A | * | 10/1950 | Wallhausen | G02B 27/34 42/123 |
| 4,495,705 A | * | 1/1985 | Kowalski | F41G 1/467 124/87 |
| 5,359,800 A | * | 11/1994 | Fisher | F41G 1/345 42/144 |
| 5,653,034 A | * | 8/1997 | Bindon | G02B 23/105 33/297 |
| 6,385,855 B1 | * | 5/2002 | Tymianski | F41G 1/345 33/263 |
| 8,011,504 B1 | * | 9/2011 | Farberov | A61B 46/10 206/363 |
| 8,443,541 B2 | * | 5/2013 | Elpedes | F41G 1/345 42/130 |
| 2010/0077646 A1 | * | 4/2010 | Gaber | F41G 1/467 42/129 |
| 2012/0151817 A1 | * | 6/2012 | Howe | F41G 1/345 42/132 |
| 2015/0153136 A1 | * | 6/2015 | Howe | F41G 1/345 42/111 |
| 2018/0231350 A1 | * | 8/2018 | Howe | F41G 1/14 |
| 2019/0041163 A1 | * | 2/2019 | Howe | F41G 1/345 |
| 2020/0393215 A1 | * | 12/2020 | Howe | F41G 1/01 |
| 2021/0108886 A1 | * | 4/2021 | Howe | F41G 1/345 |
| 2023/0131806 A1 | * | 4/2023 | Howe | F41G 1/345 42/111 |
| 2024/0011739 A1 | * | 1/2024 | Smith | F41G 1/345 |
| 2024/0426573 A1 | * | 12/2024 | Smith | F41G 1/345 |

* cited by examiner

Primary Examiner — Michael D David

(57) ABSTRACT

A protective cover for an optical sight of a firearm, with at least one transparent end wall section for protecting either a proximal opening or a distal opening of the optical sight is disclosed. In order to provide a backup sight, it is proposed for the transparent end wall section to have a permanently displayed optical reticle or a part of this reticle.

22 Claims, 10 Drawing Sheets

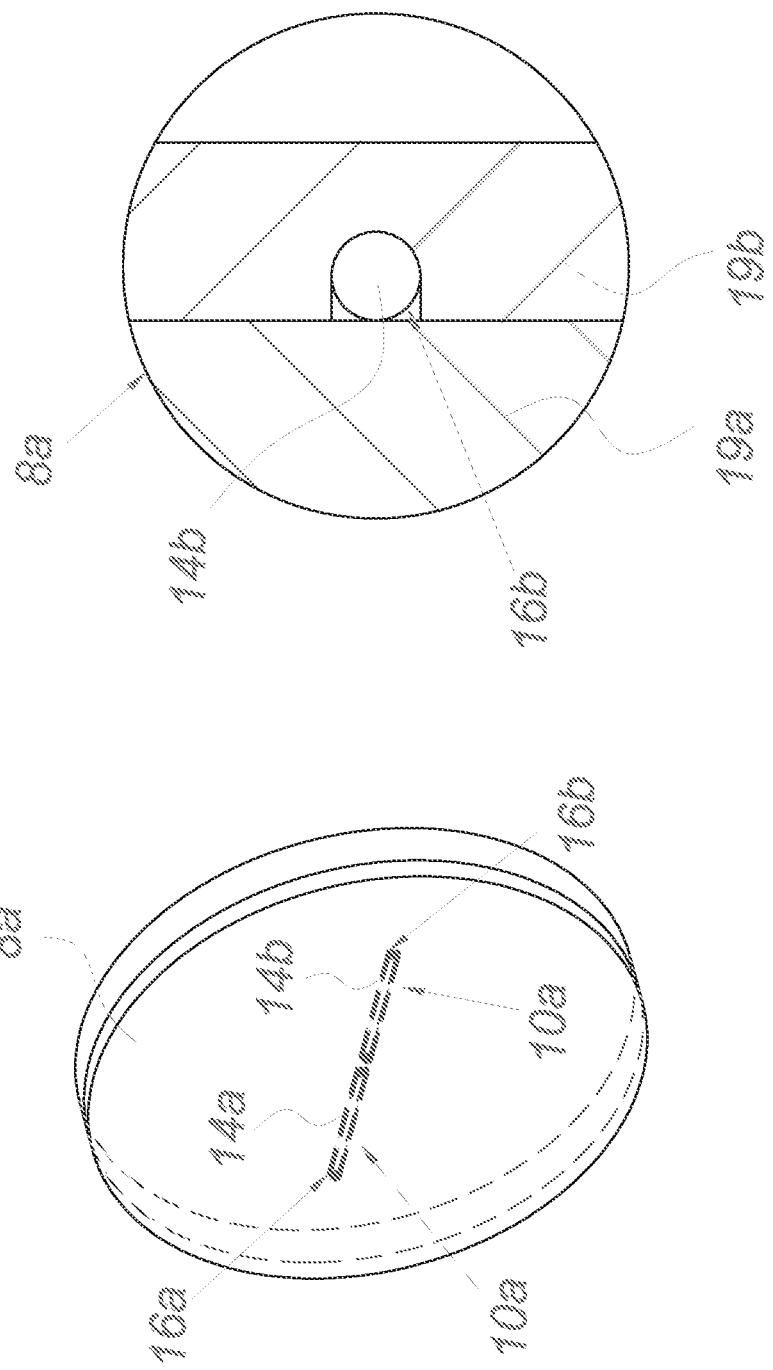

PROTECTIVE COVER FOR AN OPTICAL SIGHT

FIELD OF THE INVENTION

The invention relates to a protective cover for an optical sight of a firearm, with at least one transparent end wall section for protecting either a proximal opening or a distal opening of the optical sight.

DESCRIPTION OF THE PRIOR ART

There are known protective covers for protecting an optical sight, which are embodied as protective lids that cover the proximal opening and/or the distal opening of the sight. Among other things, protective lids are also known, which have a transparent end wall over the proximal opening and/or the distal opening so that even when the sight is covered, it is possible to see through the optical sight.

The object of the invention, therefore, is to enhance the functionality of a protective cover that is known from the prior art.

SUMMARY OF THE INVENTION

If the transparent end wall section has a permanently displayed optical reticle or a part of this reticle, then the functionality of the protective cover can be broadened to include that of a backup sight. This is advantageous more particularly in reflex sights (also known as red dot sights) whose marking in the aiming picture fails to appear for example when the power source fails. According to the invention, however, with a permanently displayed optical reticle or a part of this reticle on the protective cover, permits the sight to nevertheless be used for aiming—which can ensure operability of the firearm even in emergency situations. It is thus possible for the protective cover according to the invention to expand the optical sight to include an emergency function of the reticle so that it remains ready to use in the event of a failure of the optical sight.

Suitably, the reticle or the part of this reticle has at least one gaseous tritium light source. For example, the reticle or the part of this reticle is composed of at least one gaseous tritium light source. This radioluminescence can facilitate aiming, more particularly at night. This can also provide a weapon-carrier with sufficiently visible aiming, even in daylight. Suitably, the reticle or the part of this reticle consists of at least one gaseous tritium light source, which can particularly facilitate aiming in an emergency situation. Using, for example, at least one gaseous tritium light source, an illuminating permanently displayed optical reticle or an illuminating permanently displayed part of the optical reticle can be created.

For example, the gaseous tritium light source is fastened to the transparent end wall section. For example, the gaseous tritium light source can be glued for this purpose. With such a mounting of the gaseous tritium light source, it is also possible, for example, to enable a simpler retrofittability of protective covers without reticles. The glue can, for example, encapsulate the gaseous tritium light source and thus not only fasten it to the transparent end wall section, but also better protect it from damage in a simple way.

The gaseous tritium light source can be ruggedly protected from damage if for example the transparent end wall section has at least one recess in which the gaseous tritium light source is provided. The gaseous tritium light source can, for example, be contained completely in the recess and can also be encapsulated.

The optical visibility of the reticle can be further improved if a plurality of gaseous tritium light sources come to an end before the center of the reticle, spaced a certain distance apart from this center. For example, the gaseous tritium light sources may be spaced equidistant from the center. In addition, by means of this spacing, a non-illuminated region can be provided in the center of the reticle—which particularly facilitates an aiming at a target.

It is also conceivable that a gaseous tritium light source may run over the center of the reticle.

For example, the transparent end wall section may be made of plastic or glass in order to thus protect the gaseous tritium light source from breakage.

It is conceivable to further enhance the accuracy of the optical sight by the protective cover having two transparent end wall sections, wherein the first end wall section has a first part of the reticle and the second end wall section has a second part of the reticle that is different from first part, wherein these two parts jointly form the reticle. In this way, the two parts of the reticle specifically function in the manner of a notch and bead—which facilitates aiming, for example even in an emergency situation and/or can further enhance the accuracy of the optical sight.

The operation of the protective cover can be facilitated if the protective cover is composed of at least one protective lid. A protective lid can also ruggedly protect the optical sight from mechanical damage.

It is also conceivable for the protective cover to be composed of a protective cap.

For example, the protective cover may be composed of two protective lids of which the first protective lid has the first transparent end wall section and the second protective lid has the second transparent end wall section. The protective cover with its advantages can either be hinged to the optical sight in a known way or alternatively can be removed from the optical sight. Suitably, the two protective lids are not directly linked to each other. It is also conceivable, however, for them to be connected to each other by means of a securing strap or cord.

The design of the protective cover can be simplified if the protective cover has a base body section, which adjoins the transparent end wall section. In this case, the base body section can transition integrally into the end wall section or can hold the latter, for example by means of a receptacle.

Suitably, the base body section forms a bezel, which encloses the transparent end wall section. In this way, the transparent end wall section can be better protected from damage.

For example, the base body section has at least one hinge element for a swiveling hinge on the optical sight in order to thus be able to ruggedly fasten the protective cover to the optical sight.

It is, however, also conceivable, for example, for the base body section to form an elastic outer annular edge for a clamped connection to the optical sight—which makes it possible to provide or remove the protective cover in a user-friendly way.

It can be advantageous for the operation if the base body section is embodied in the form of a U-shaped profile. It is thus possible for the protective cover to be placed onto the optical sight—which can cover the latter completely and thus better protect it.

It is also conceivable for the base body section to have an elastic snap element in order to secure the protective cover to the optical sight.

If the protective cover has, for example, a circumferential elastic sealing lip, then it is possible to further improve the protection of the optical sight from dirt. Suitably, the sealing lip completely surrounds the transparent end wall section. For example, the sealing lip is provided on the, for example opaque, base body.

Suitably, the protective cover according to the invention can be used in an optical sight. For example, this can be advantageous in a reflex sight whose power source, when it fails, causes a marking or more precisely, a target point in the aiming picture, to fail to appear, thus rendering the optical sight nonfunctional. This situation can also occur when there is a malfunction in the electronics or in other components that are needed to produce an illuminated target point of the reflex sight. In addition, when open reflex sights are used, soiling can cause malfunctions—specifically despite the presence of functional components. In addition, electronic optical sights generally require a certain amount of time to power up, which restricts a rapid use of the firearm—this also often occurs due to the time-consuming removal of protective covers for the comparatively sensitive optics.

The protective cover according to the invention can eliminate all of these disadvantages by enhancing a known optical sight with an emergency function for the reticle and thus in the event of a failure of the optical sight, remains ready to use—even in spite of the prevailing conditions.

Suitably, the protective cover is detachably fastened to the optical sight by means of at least one clamped connection or at least one snapped connection. This makes it possible for the protective cover to be ruggedly secured to the optical sight.

In this case, the protective cover can be movably supported on the optical sight by means of at least one hinge. It is thus possible to provide a kind of folding mechanism in order to fold the protective cover onto or away from the proximal opening and/or a distal opening.

For example, the optical sight may be a reflex sight or a telescopic sight.

The above-mentioned optical sight is suitable for firearms. Suitably, this optical sight is provided on long guns.

BRIEF DESCRIPTION OF THE DRAWINGS

In the figures, the subject matter is shown in greater detail by way of example based on several embodiment variants. In the drawings:

FIG. 10 shows a three-dimensional view of an alternative transparent end wall section of the protective covers according to FIGS. 1 to 7, FIG. 10a shows a broken cutaway view of FIG. 10.

DETAILED DESCRIPTION OF THE PREFERRED EMBODIMENTS

Figure 1:
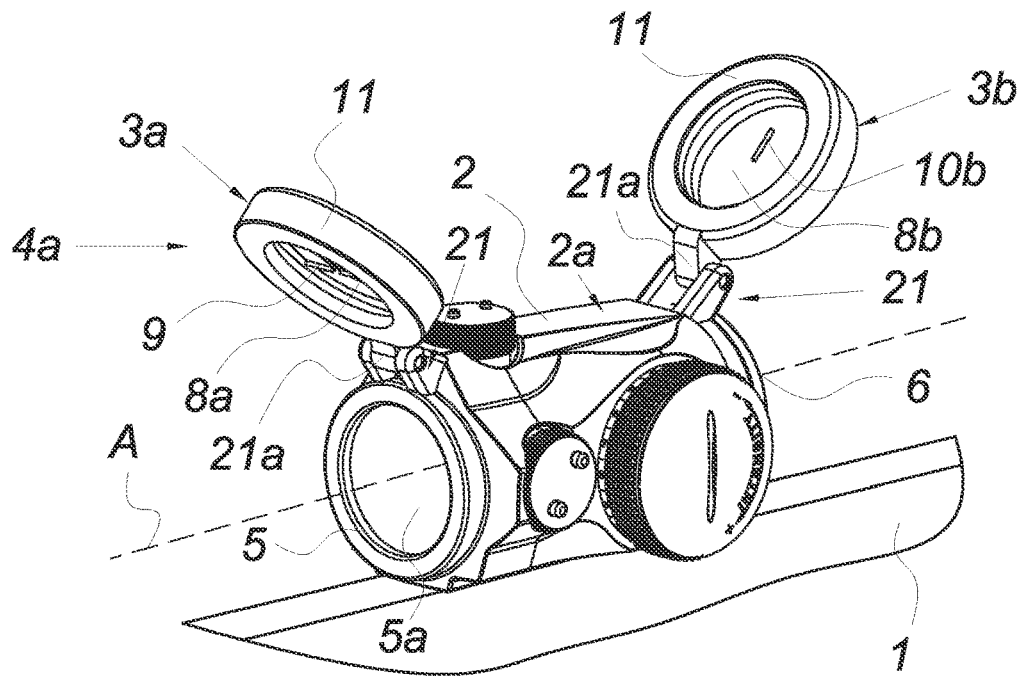
FIG. 1 shows a three-dimensional depiction of a first optical sight with two pivoting protective covers fastened to it.

For example, FIG. 1 shows an optical sight 2, namely a reflex sight 2a with a "closed" design, on a partially depicted firearm 1. The optical sight 2 has two protective covers 3a, 3b linked to it for protecting the optical sight 2, which are shown in the folded-open position 4a in FIG. 1 and in the folded-closed position 4b in FIG. 2. For this purpose, the protective covers 3a, 3b each have a transparent end wall section 8a, 8b, which protects either a proximal opening 5 such as the ocular of reflex sight 2a or a distal opening 6 such as the objective of the reflex sight 2a. The proximal opening 5 and the distal opening 6 lay on an optical axis A of the optical sight 2. This reflex sight 2a has for example an ocular lens at the ocular and for example an objective lens at the objective. The reflex sight 2a constitutes, for example, a non-magnifying optical sight 2, imaging the target object in a ratio of 1:1 for the marksman.

The transparent end wall sections 8a, 8b are also positioned along the optical axis A of the optical sight 2. Because the end wall sections 8a, 8b are transparent, even in the folded-closed and thus protected position 4b, it is possible to see through the optical sight 2.

Figure 3:
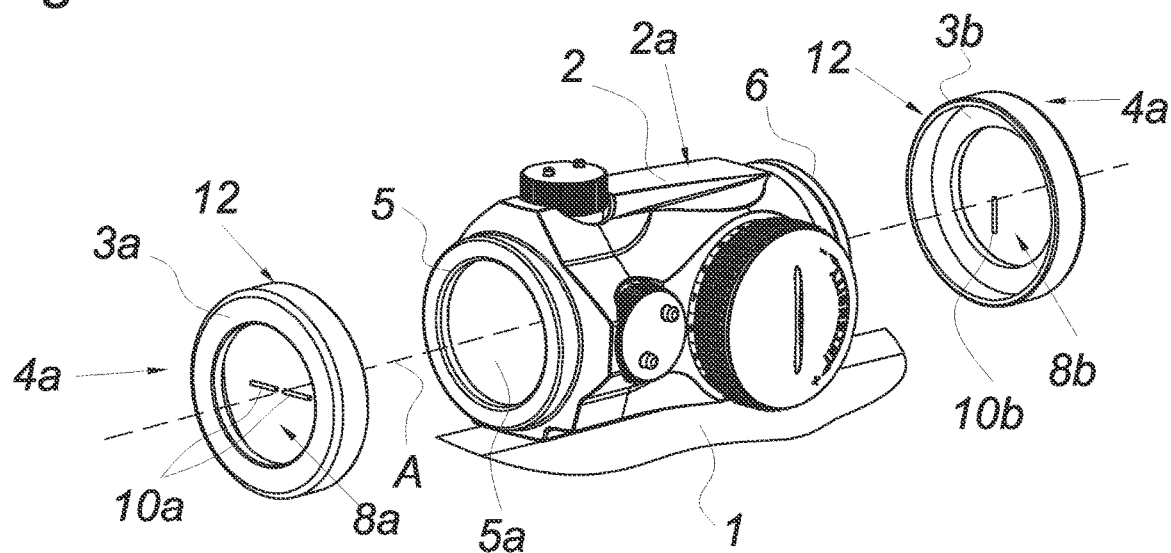
FIG. 3 shows a three-dimensional depiction of a second optical sight with two removable protective covers.
Figure 4:
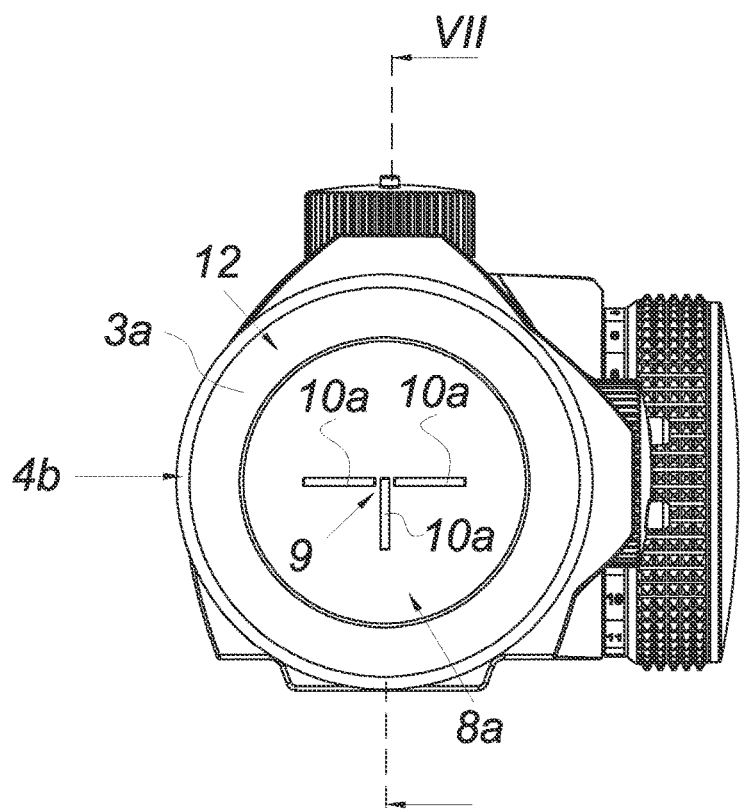
FIG. 4 shows a front view of the sight shown in FIG. 3.

The protective covers 3a, 3b can also be embodied so they can be removed from the optical sight 2 individually—as shown in FIG. 3. FIG. 3 shows the removed position 4a and FIG. 4 shows the position 4b in which they are clamped to the optical sight 2. These protective covers 3a, 3b also each have a transparent end wall section 8a, 8b.

Figure 5:
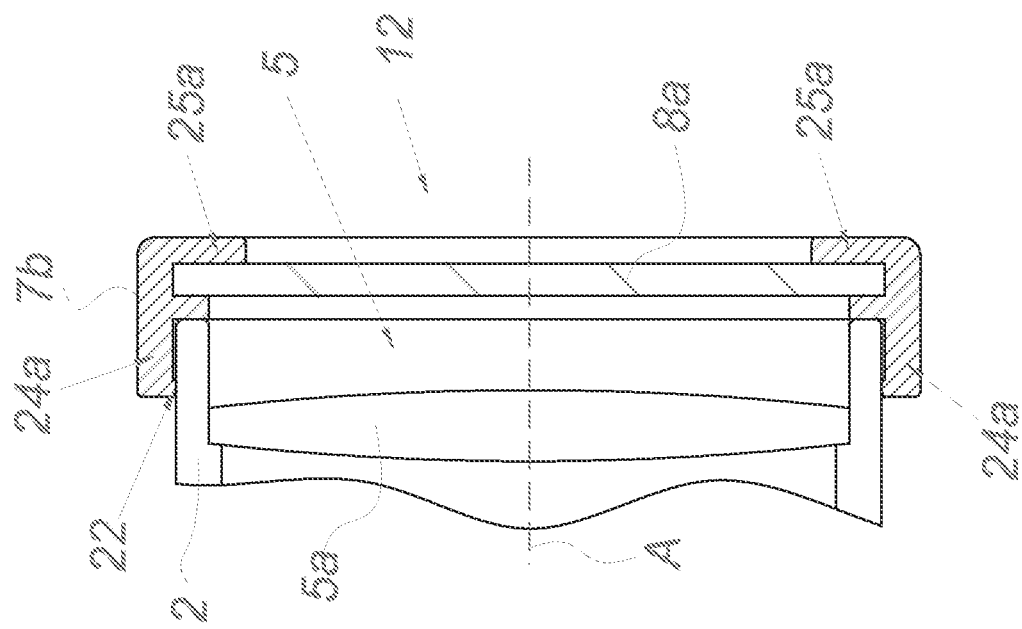
FIG. 5 shows a cutaway view along the line VI-VI in FIG. 2.
Figure 6:
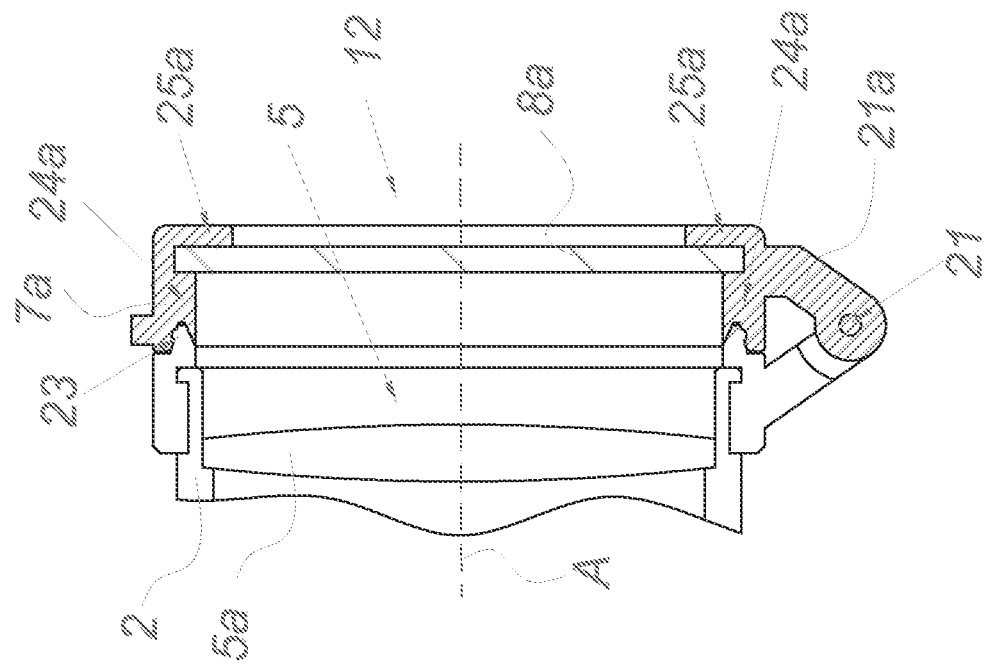
FIG. 6 shows a cutaway view along the line VII-VII in FIG. 4.
Figure 7:
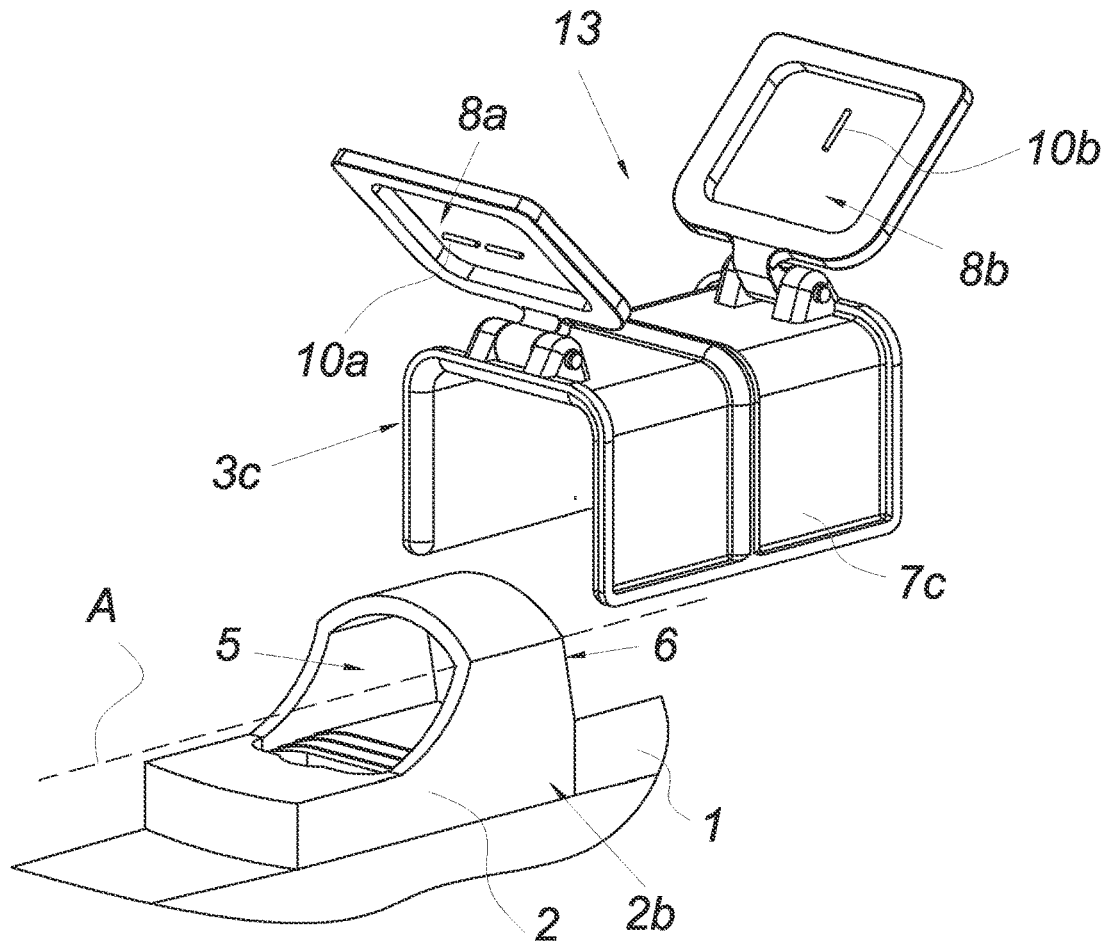
FIG. 7 shows a three-dimensional depiction of a third optical sight with a protective cover embodied in the form of a protective hood.
Figure 7A:
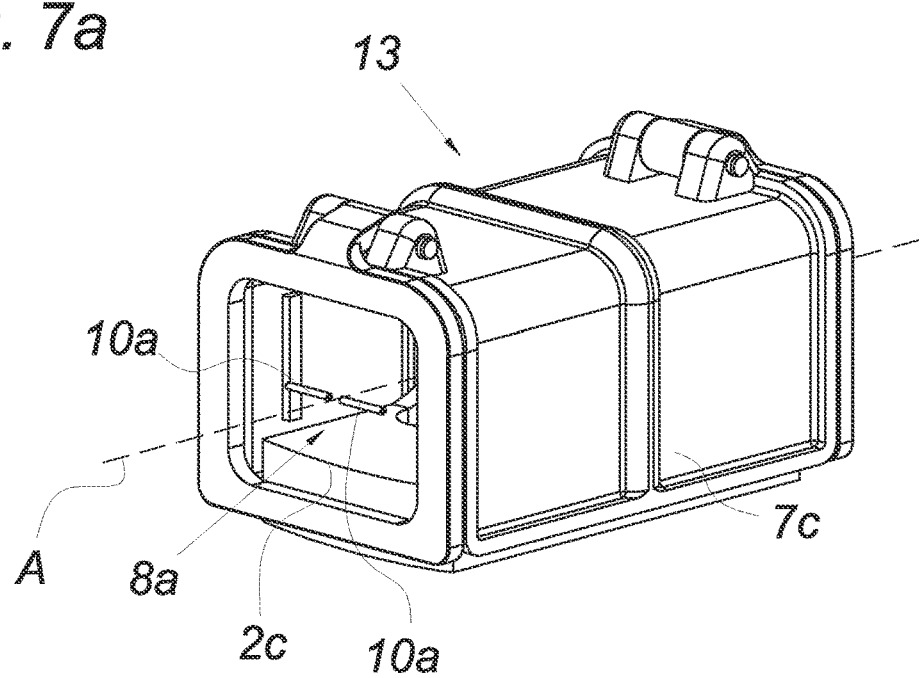
FIG. 7a shows a front view of the sight shown in FIG. 7.

By contrast with the protective covers 3a, 3b that are shown in FIGS. 1 to 6 and are embodied as protective lids 11, 12, a third protective cover 3c that is shown in FIG. 7 and in FIG. 7a is embodied as a protective cap 13 that has two end wall sections 8a, 8b.

According to the invention, the functionality of these protective covers 3a, 3b, 3c is enhanced such that its transparent end wall sections 8a, 8b enable provision of a permanently displayed optical reticle 9. Thus even in the event of a failure of an electrical/electronic reticle in the optical sight 2, based on the presence of the protective covers 3a, 3b, 3c, it is possible to aim using the reticle 9, 10 of the protective covers 3a, 3b, 3c. The firearm 1 is thus provided with a backup sight. In this connection, it advantageously does not matter how the protective covers 3a, 3b, 3c are connected to the optical sight 2, as has already been described above.

As shown in FIGS. 1 to 7, the presence of the reticle 9 is enabled by the fact that the transparent end wall sections 8a, 8b each have a part 10a, 10b of the permanently displayed optical reticle 9. The first end wall section 8a has a first part 10a of this reticle 9 while the second end wall section 8b has a second part 10b of this reticle 9 that is different from the first part 10a. This can be seen, for example in FIGS. 1, 3, and 7, by virtue of the fact that the first part 10a is formed by two horizontal straight markings and the second part 10b is formed by one vertical straight marking.

These two parts 10a, 10b jointly form the reticle 9—as is shown by way of example for all of the embodiments illustrated in FIGS. 2, 3c, 4, 7, and 12. It can be seen that the permanently displayed parts 10a, 10b are embodied as lines and the optical reticle 9 is embodied as a pattern of these lines. According to certain embodiments, which may be applied to any of the embodiments described herein, the permanently displayed optical reticle 9 or the permanently displayed part 10a, 10b of the optical reticle 9 can be designed to be partially or completely illuminating.

In general, the permanently displayed optical reticle 9 or the permanently displayed parts 10a, 10b of the optical reticle 9 may comprise at least a line, an aiming point, a dot, a square, a rectangle, a ring, a circle, one or more symbols, or even a combination thereof. Usually, an optical reticle 9 is embodied as a pattern of lines or markings.

FIGS. 1 to 7 show that all of the protective covers 3a, 3b, 3c have a base body section 7a, 7b, 7c, which adjoins each transparent end wall section 8a, 8b. The protective covers 3a, 3b, 3c differ essentially based on the fasteners with which they are respectively attached to the optical sight 2.

Figure 2:
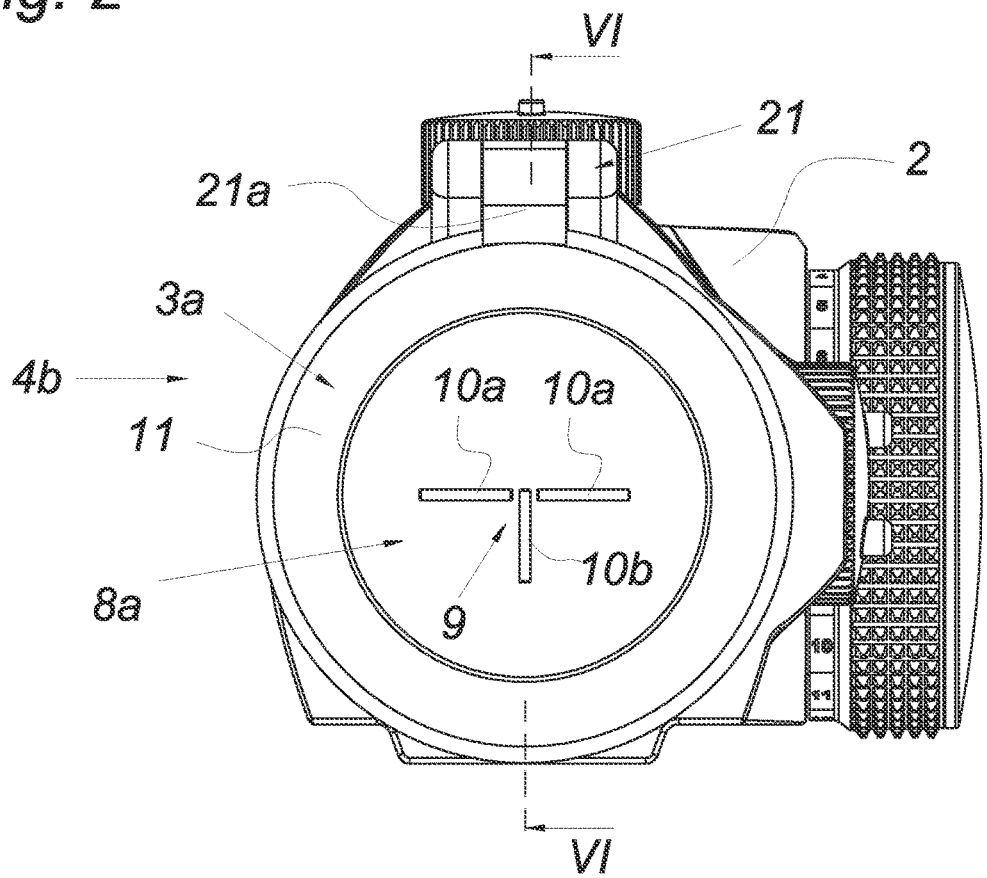
FIG. 2 shows a front view of the sight shown in FIG. 1.

Thus the base body section 7a of the protective covers 3a, 3b embodied as protective lids 11 according to FIGS. 1, 2, and 5 each have a hinge element 21a for a respective swiveling hinge 21 on the optical sight 2. The other hinge element 21a of the relevant swiveling hinge 21 that cooperates with the first is provided on the optical sight 2. In addition, a snap mechanism is provided with the optical sight 2. For this purpose, the base body section 7a has a completely circumferential snap element 23 that secures the folded-closed position 4b of the protective covers 3a, 3b on the optical sight 2. Each snap element 23 is positioned on the elastic outer annular edge 24a, 24b of the base body section 7a. The base body section 7a also has a bezel 25a, 25b that encloses the respective transparent end wall section 8a, 8b and thus secures it on the base body section 7a.

Instead of the hinge element 21a and the snap element 23, the protective covers 3a, 3b embodied as protective lids 12 according to FIGS. 3, 4, and 6 have a clamped connection to the optical sight 2. The clamped connection is produced by the elastic outer annular edge 24a, 24b of the base body section 7b, which due to its elasticity produces a non-positive connection to the optical sight. The annular edge 24a, 24b also has a sealing lip 22.

As can also be seen in FIGS. 1 to 7, the outer elastic annular edge 24a, 24b adjoins the bezel 25a, 25b of the protective cover 3a, 3b. The annular edge 24a, 24b, the bezel 25a, 25b, and possibly the snap element 23 consist of an opaque, for example, non-translucent, material. The protective covers 3a, 3b are for example composed of one piece and consist of a plastic.

For example, the base body sections 7a, 7b consist entirely of an elastic plastic, which for example facilitates manipulation of the protective cover 3a, 3b, 3c.

The protective cover 3c for an optical sight 2 shown in FIG. 7 and FIG. 7a is embodied in the form of a rigid one-piece protective cap 13. For example, this embodiment is used with an open sight 2, namely an open reflex sight 2b, since this type of optical sight lacks a protective glass or lens at the proximal opening 5. This reflex sight 2b constitutes, for example, a non-magnifying optic sight 2, imaging the target object in a ratio of 1:1 for the marksman. This one-piece protective cap 13 has an opaque base body 7c and two transparent end wall sections 8a, 8b that are each movably fastened to it by means of a hinge. It is also conceivable, however, for there to be a one-piece protective cap 13 in that the end wall sections 8a, 8b are rigidly connected to the base body 7c—for example produced by means of a multi-component injection molding process.

The first and second parts 10a, 10b of the reticle 9 consist of gaseous tritium light sources 14a, 14b, 15, which are fastened to the transparent end wall section 8a, 8b. These gaseous tritium light sources 14a, 14b, 15 are known as GTLS. In all of the exemplary embodiments, these radioluminescent gaseous tritium light sources 14a, 14b, 15 have an outer sleeve in the form of a hermetically sealed round glass tube made of borosilicate glass. The glass tube is coated on the inside with a luminophore such as zinc sulfide and filled with tritium.

The transparent end wall section 8a, 8b consists of an inelastic plastic—which for example facilitates the mounting of the gaseous tritium light sources 14a, 14b, 15. This is all the more true since the gaseous tritium light sources 14a, 14b, 15 are provided in recesses 16a, 16b, 17 in the transparent end wall section 8a, 8b, as shown in FIGS. 8 to 11. These recesses 16a, 16b, and 17 can be embodied in various ways.

Figure 8A:
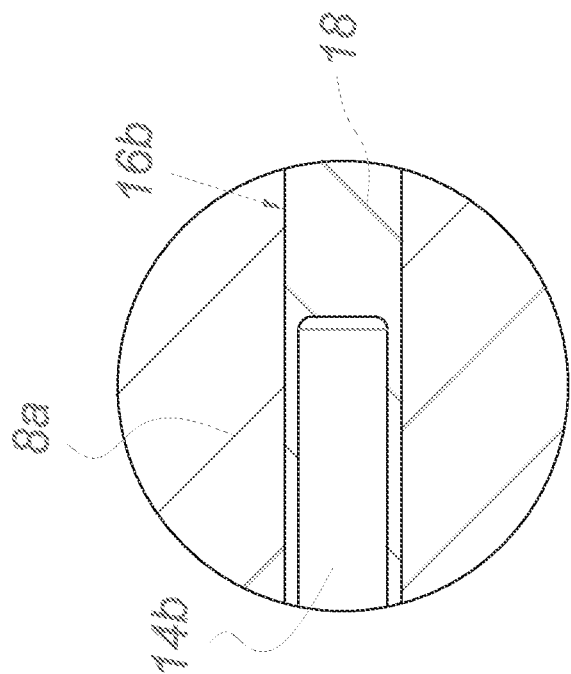
FIG. 8a shows a broken cutaway view of FIG. 8.
Figure 8:
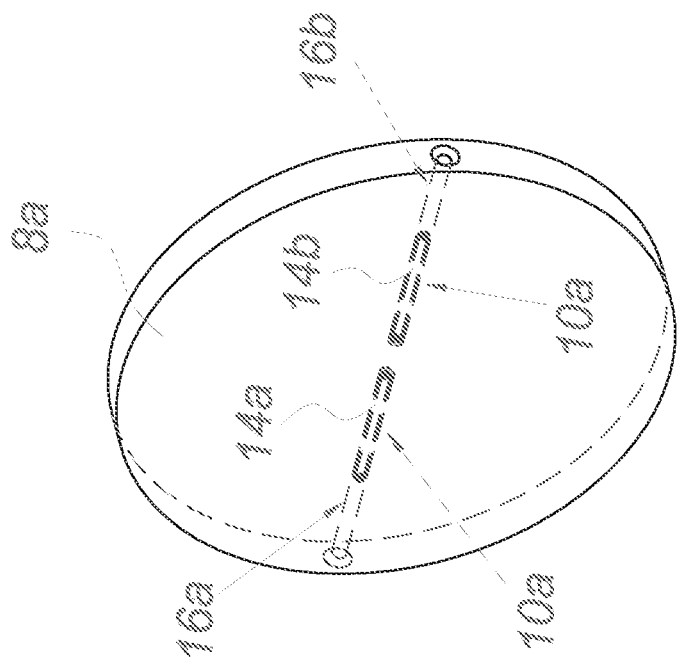
FIG. 8 shows a three-dimensional view of a transparent end wall section of the protective covers according to FIGS. 1 to 7.

According to FIG. 8, drilled recesses 16a, 16b are provided extending in from the side surface of the transparent end wall section 8a of the protective cover 3a. This construction is also the case for the other recess 17 of the transparent end wall section 8b of the protective cover 3b. A gaseous tritium light source 14a, 14b, 15 is inserted into each of these drilled recesses 16a, 16b, 17 and glued in place with glue 18, as shown in FIG. 8a. The gaseous tritium light source 14a, 14b, 15 is thus encapsulated and protected from damage.

Figure 9A:
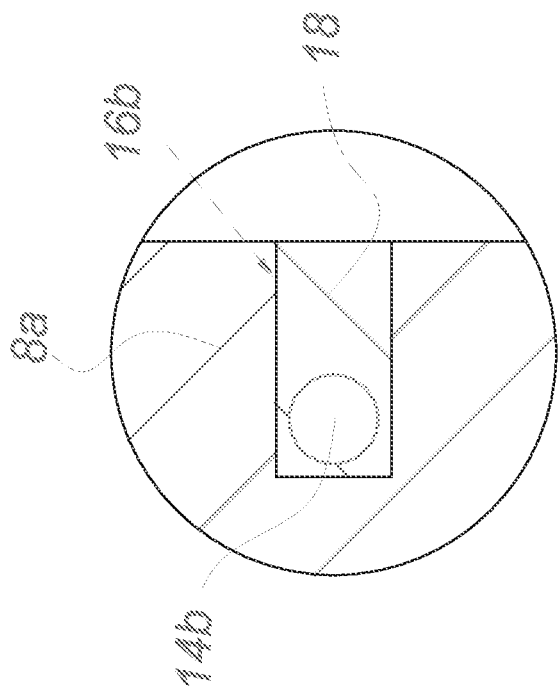
FIG. 9a shows a broken cutaway view of FIG. 9.
Figure 9:
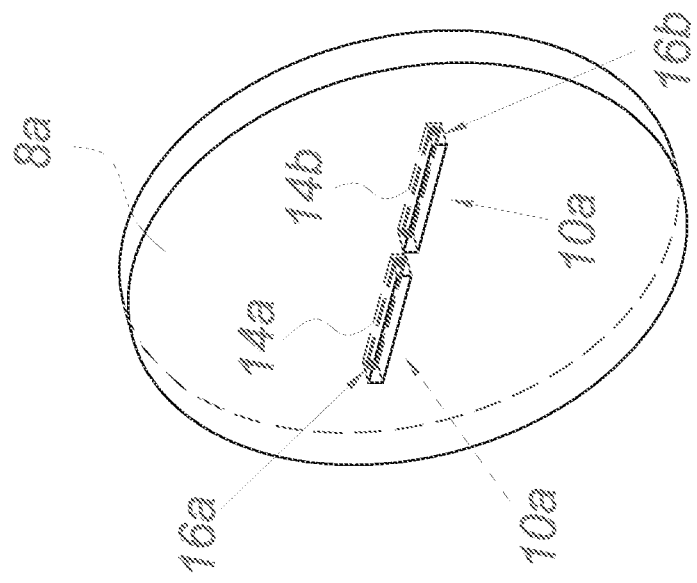
FIG. 9 shows a three-dimensional view of an alternative transparent end wall section of the protective covers according to FIGS. 1 to 7.

According to FIG. 9, these milled recesses 16a, 16b are provided in the broad side of the transparent end wall section 8a of the protective cover 3a, which broad side is at the back—i.e. facing the proximal opening 5 or the distal opening 6. This type of construction is also used for the other recess 17 of the transparent end wall section 8b of the protective cover 3b. A respective gaseous tritium light source 14a, 14b, 15 is inserted into each of these milled recesses 16a, 16b, 17 and glued in place with glue 18, as shown in FIG. 9a. The gaseous tritium light sources 14a, 14b, 15 are thus encapsulated and protected from damage.

According to FIG. 10, these recesses 16a, 16b are provided in a sandwich construction for example composed of two material layers 19a, 19b of the transparent end wall section 8a of the protective cover 3a. This construction is also the case for the other recess 17 of the transparent end wall section 8b of the protective cover 3b. A gaseous tritium light source 14a, 14b, 15 is provided in each of the recesses 16a, 16b, 17 provided between these layers, as shown in FIG. 10a. The gaseous tritium light sources 14a, 14b, 15 are thus encapsulated and protected from damage.

Figure 11A:
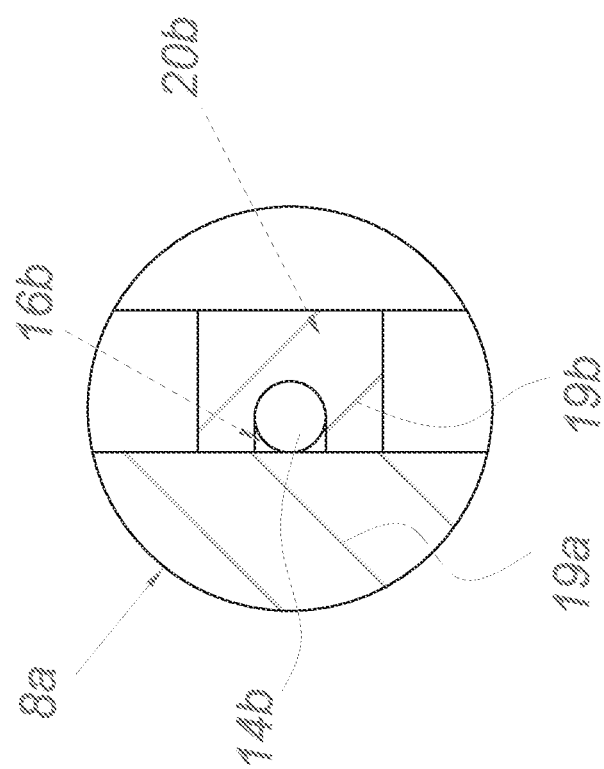
FIG. 11a shows a broken cutaway view of FIG. 11
Figure 11:
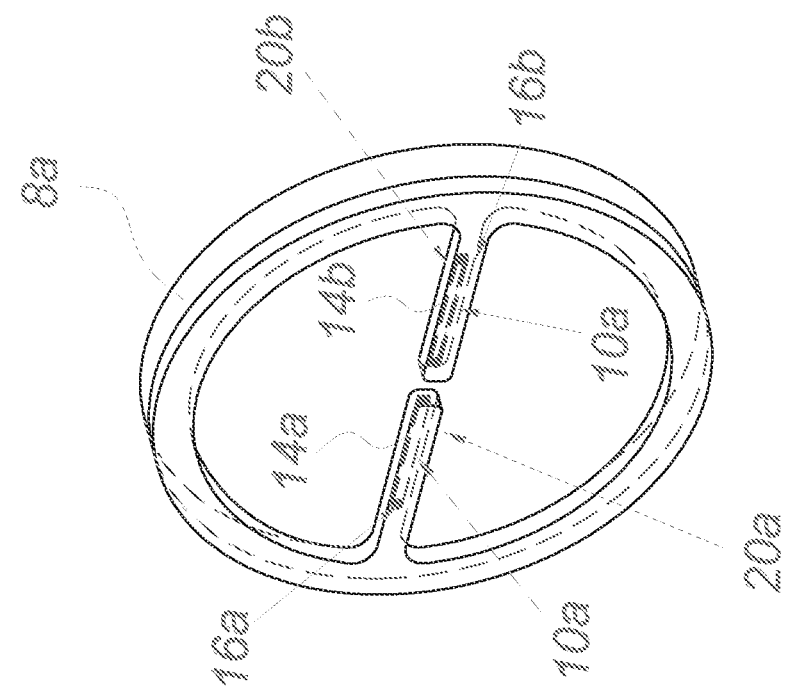
FIG. 11 shows a three-dimensional view of an alternative transparent end wall section of the protective covers according to FIGS. 1 to 7.

According to FIG. 11, these recesses 16a, 16b—the same as the ones in FIG. 10—are also provided in a sandwich construction composed of two material layers 19a, 19b of the transparent end wall section 8a of the protective cover 3a. The second material layer 19b extends over the circumference of the transparent end wall section 8a, which is adjoined by the two central bridge pieces 20a, 20b that extend toward each other. The gaseous tritium light sources 14a, 14b are provided in these bridge pieces 20a, 20b, as shown in FIG. 11a. The gaseous tritium light sources 14a, 14b are thus encapsulated and protected from damage.

Figure 3A:
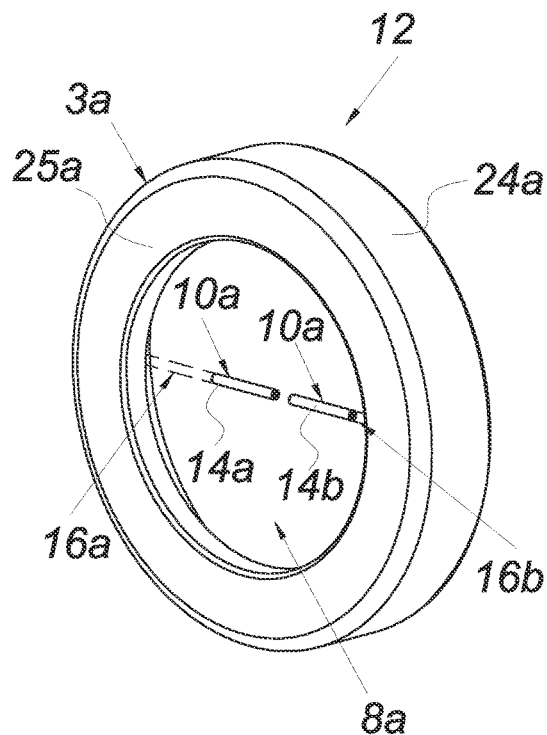
FIGS. 3a & 3b show detail views of the removable protective covers shown in FIG. 3.
Figure 3B:
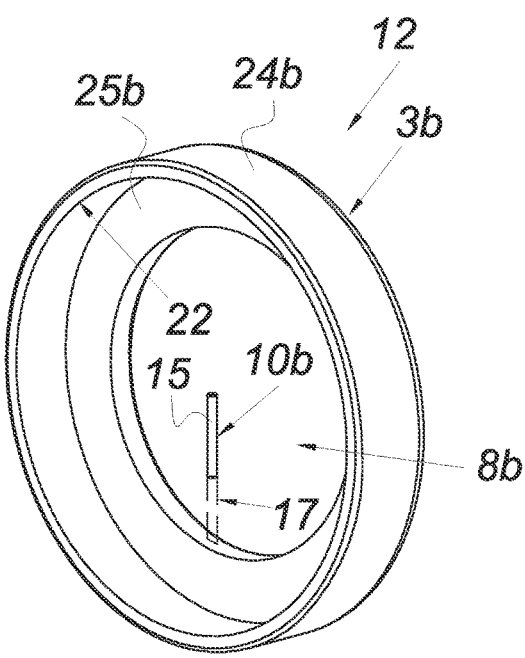
Figure 3C:
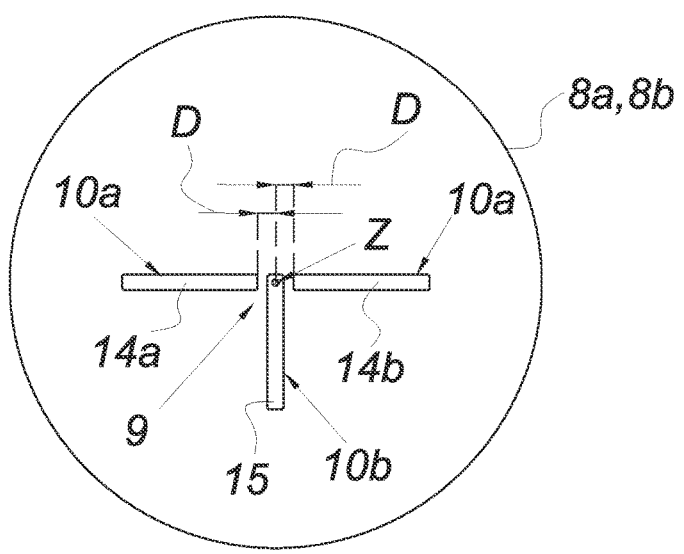
FIG. 3c shows a detail view of a permanently displayed optical reticle of the protective covers according to FIGS. 1 to 3.

According to FIG. 3c, in the first protective cover 3a, the first horizontal and second horizontal gaseous tritium light sources 14a, 14b also come to an end before the center Z of the transparent end wall section 8a spaced the same distance D apart from this center.

Also, it can be seen in FIG. 3c, that the third vertical gaseous tritium light source 15 runs over the center Z of the reticle 9. The end of the third gaseous tritium light source 15 closes flat with the top of the first and second gaseous tritium light sources 14a, 14b. It is thus possible to facilitate the aiming.

Figure 12:
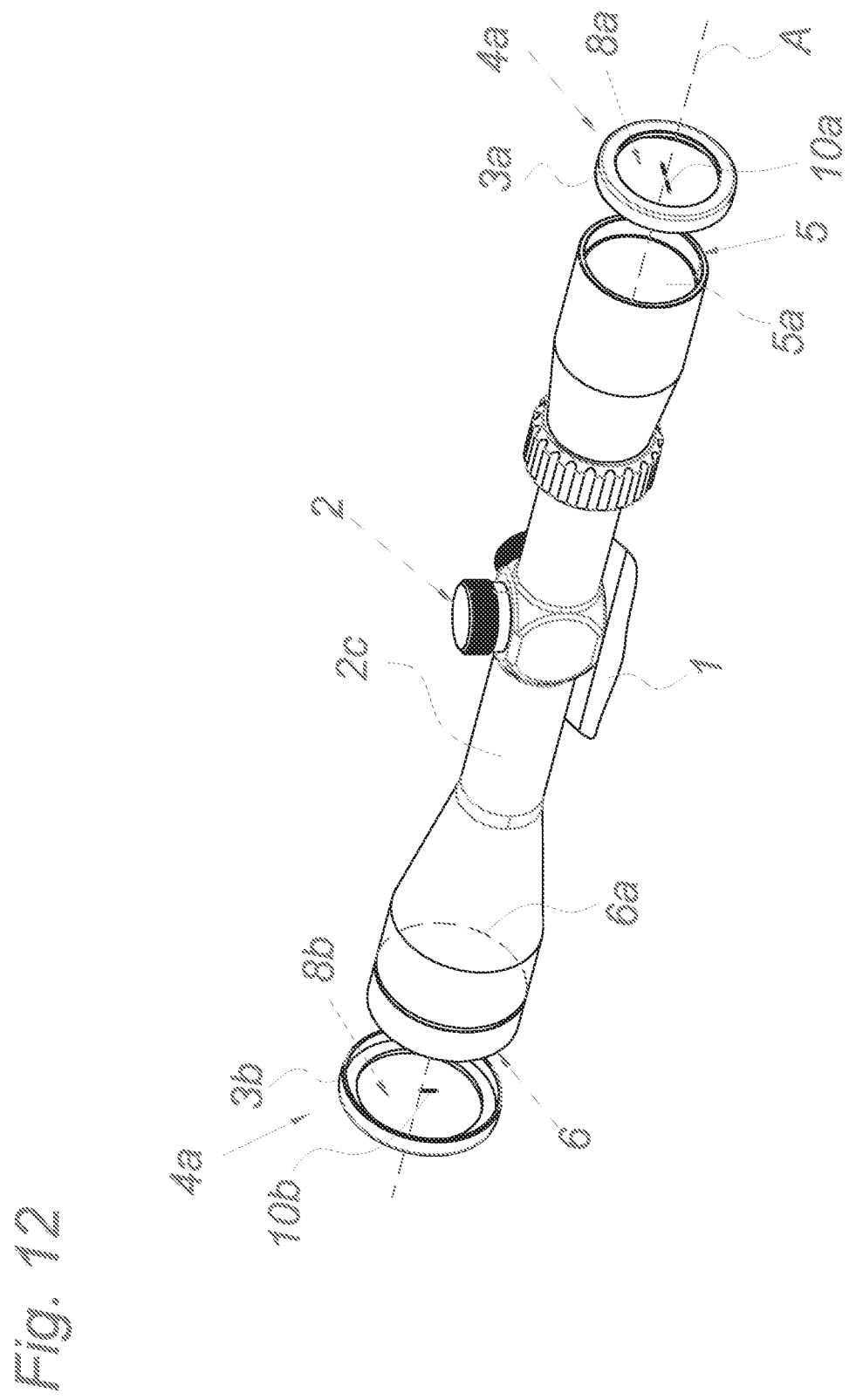
FIG. 12 shows a three-dimensional depiction of a fourth optical sight with two removable protective covers.

FIG. 12 shows, for example, an optical sight 2, namely a telescopic sight 2c, whose proximal opening 5 and distal opening 6 are each protected by the removable protective cover 3a, 3b. Thus, the protective cover 3a protects the ocular with the ocular lens 5a and the protective cover 3b protects the objective with the objective lens 6a of the telescopic sight 2c. The protective covers 3a, 3b are the same as described for FIG. 3 and their transparent end wall section 8a, 8b lay on the optical axis A of the optical sight 2. Also, the proximal opening 5 and the distal opening 6 lay on this optical axis A. The telescopic sight 2c constitutes, for example, a non-magnifying optic sight 2, imaging the target object in a ratio of 1:1 for the marksman. However, any other ratio is also conceivable.

The invention claimed is:

1. A protective cover for an optical sight of a firearm, comprising:
    a permanently displayed optical reticle; and
    two transparent end wall sections, wherein a first transparent end wall section of the two transparent end wall sections protects a proximal opening of an optical sight and a second transparent end wall section of the two transparent end wall sections protects a distal opening of the optical sight, wherein the first transparent end wall section has a first part of the reticle and the second transparent end wall section has a second part of the reticle that is different from the first part, and wherein the first part and the second part jointly form the reticle.

2. The protective cover according to claim 1, wherein the reticle comprises at least one gaseous tritium light source.

3. The protective cover according to claim 2, wherein the at least one gaseous tritium light source is fastened to the at least one of the two transparent end wall sections.

4. The protective cover according to claim 3, wherein the at least one transparent end wall section has at least one recess in which the at least one gaseous tritium light source is provided.

5. The protective cover according to claim 2, wherein a plurality of the at least one gaseous tritium light source comes to an end before a center of the reticle, spaced a certain distance apart from the center of the reticle, and/or the at least one gaseous tritium light source extends over the center of the reticle.

6. The protective cover according to claim 1, wherein the two transparent end wall sections each consist of plastic or glass.

7. The protective cover according to claim 1, wherein the protective cover is composed of at least one protective lid.

8. The protective cover according to claim 7, wherein the protective cover is composed of two protective lids, wherein a first protective lid comprises the first transparent end wall section and a second protective lid comprises the second transparent end wall section.

9. The protective cover according to claim 1, wherein the protective cover comprises a base body section, which adjoins the two transparent end wall sections.

10. The protective cover according to claim 9, wherein the base body section forms a bezel, which encloses the at least one of the two transparent end wall sections, and/or the base body section forms at least one hinge element for a swiveling hinge on the optical sight.

11. The protective cover according to claim 9, wherein the base body section has a U-shaped profile.

12. The protective cover according to claim 9, wherein the base body section comprises an elastic snap element.

13. An optical sight comprising the protective cover according to claim 1.

14. The optical sight according to claim 13, wherein the protective cover is detachably fastened to the optical sight by at least one clamped connection or at least one snapped connection.

15. The optical sight according to claim 13, wherein the protective cover is movably supported on the optical sight by at least one hinge.

16. The optical sight according to claim 13, wherein the optical sight is a reflex sight.

17. A firearm comprising the optical sight according to claim 13.

18. The protective cover according to claim 1, wherein the protective cover is composed of at least one protective cap.

19. The protective cover according to claim 9, wherein the base body section forms an elastic outer annular edge for a clamped connection to the optical sight.

20. The protective cover according to claim 9, wherein the base body section comprises a circumferential elastic sealing lip.

21. The optical sight according to claim 13, wherein the optical sight is a telescopic sight.

22. The protective cover according to claim 1, wherein each of the first part and the second part of the reticle comprises at least one gaseous tritium light source.

* * * * *